United States Patent [19]

Wuenscher et al.

[11] 4,428,712
[45] Jan. 31, 1984

[54] CAPTIVE WATER CURRENT POWER SYSTEM

[76] Inventors: Hans F. Wuenscher, late of Huntsville, Ala.; Hertha A. Wuenscher, Administratrix, 2004 Dogwood La., Huntsville, Ala. 35810

[21] Appl. No.: 206,185

[22] Filed: Nov. 12, 1980

[51] Int. Cl.³ .......................................... F01D 25/28
[52] U.S. Cl. ........................................ 415/7; 416/24
[58] Field of Search ............... 416/85, 86, 23, 24, 416/111, 119; 415/7; 440/8.9; 114/274, 275, 281; 60/398; 405/75; 290/52, 54

[56] References Cited

FOREIGN PATENT DOCUMENTS

| | | | |
|---|---|---|---|
| 52-1346 | 1/1977 | Japan | 415/7 |
| 1508796 | 4/1978 | United Kingdom | 416/85 |
| 2000233 | 1/1979 | United Kingdom | 416/23 |

*Primary Examiner*—Harvey C. Hornsby
*Assistant Examiner*—Shewen Bian

[57] ABSTRACT

Current energy is converted into shaft power in two stages;

First, buoyant power units with stationary hydrofoil wings reach faster than the current speed by sweeping out a captive path.

Second, turbines at said power units convert the fast relative local current into shaft power.

Power units sweeping along the water surface, using cycloidal turbine methods, as well as power units sweeping on a submerged path, using axial flow turbine methods, are described.

8 Claims, 9 Drawing Figures

CAPTIVE WATER CURRENT POWER SYSTEM

BACKGROUND OF THE INVENTION

1. Field of the Invention

This invention relates to the exploitation of the energy in natural water currents, by use of water turbines in a noval two stage energy conversion arrangement.

2. Description of the Prior Art

Presently, economical application of water turbines is only possible in combination with dams, concentrating in a static way the low energy of natural currents. For direct exploitation huge size turbines of all types have been proposed, but the technical feasibility and economical practicability remains open. My invention solves the problem by introducing a dynamic concentration of the current energy, a type of dynamic dam, before the turbines are employed.

SUMMARY OF THE INVENTION

The main objective of my invention is to provide a practical system for direct conversion of natural water current energy into shaft power useable for onboard production of materials or electric power.

A specific objective is to provide a plant capable of economically using the abundantly available ocean currents and other low speed currents where dams can not be constructed.

The technical objective is to fully utilize the inherently efficient lifting properties of hydrofoil wings.

Another objective is to utilize a stationary wing system on a moving plant for concentrating the flow energy by sweeping out and slowing down a large cross section of the natural current and have a small accelerated flow area drive small turbines to convert the equivalent of the sweep-energy into on board shaft power.

Another objective is to provide practical mooring systems.

DETAILED DESCRIPTION OF THE DRAWINGS

Figure 1:
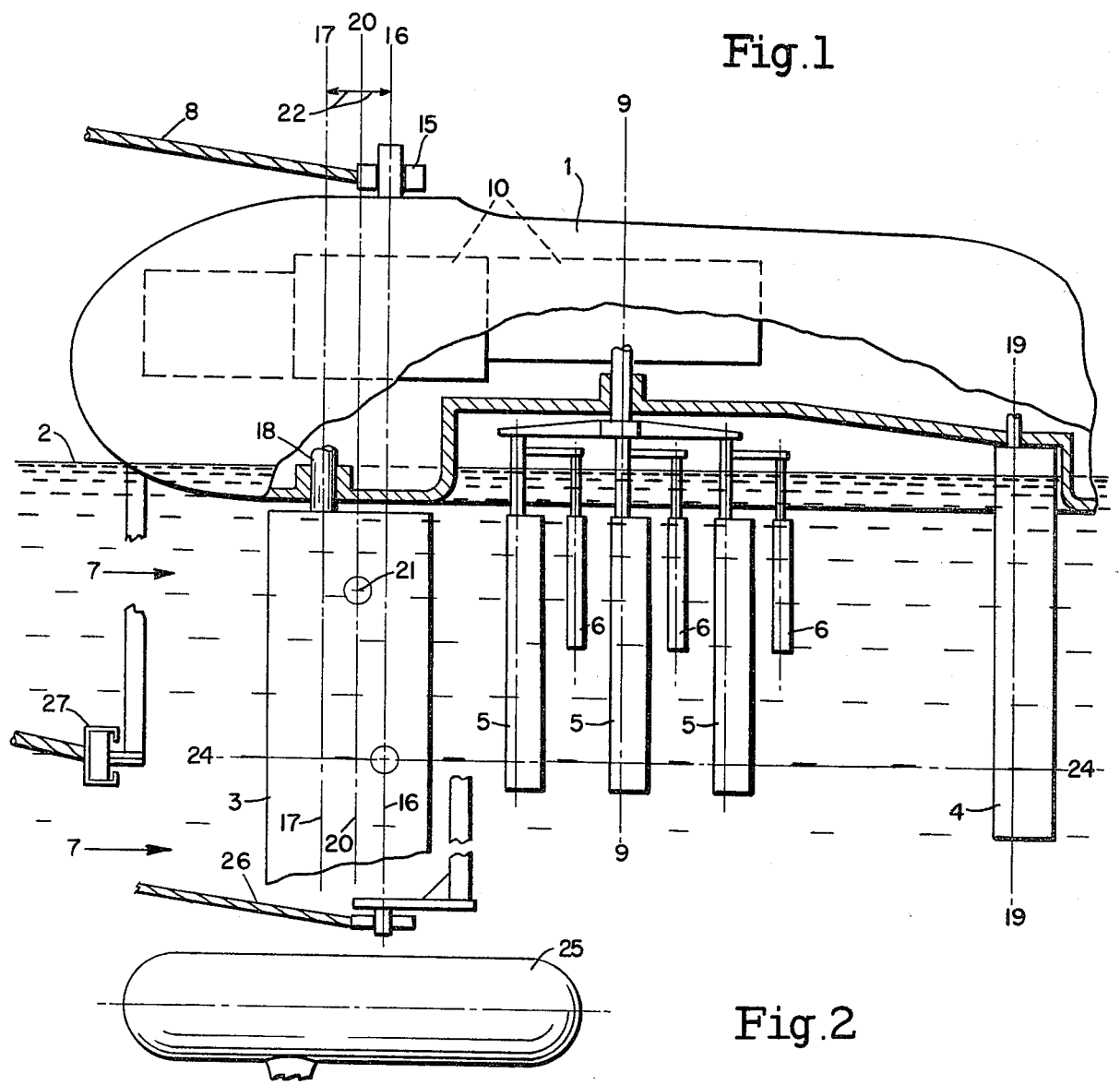
FIGS. 1 and 2 show a side and plan view of a power unit forming a two-stage energy conversion system.
Figure 2:
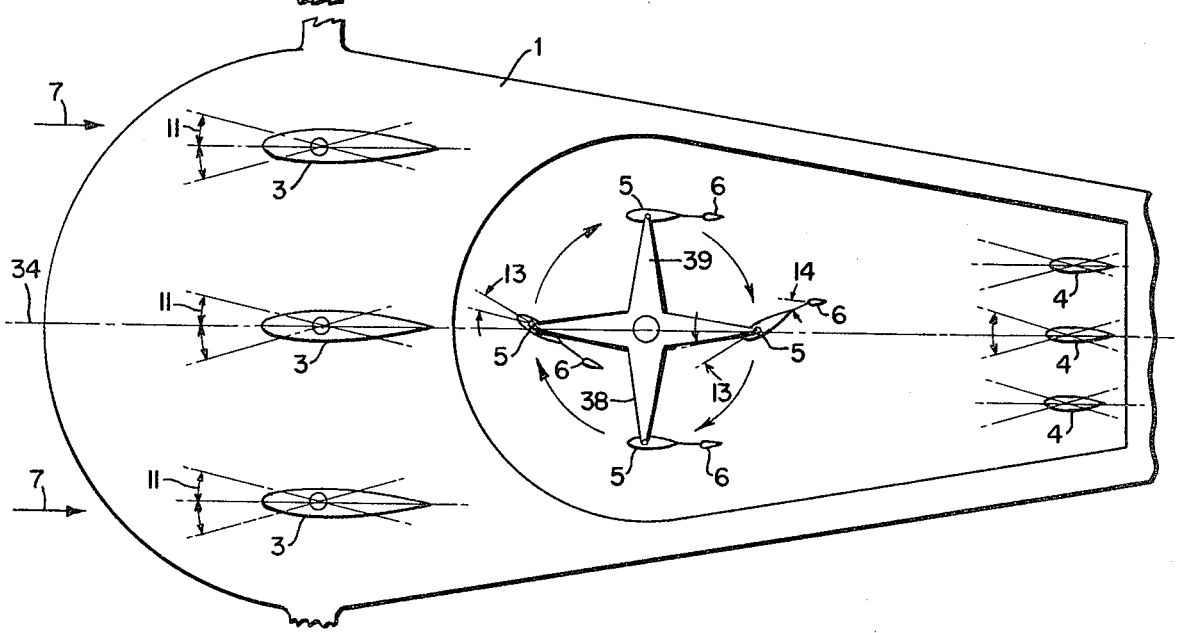

The conversion of energy in a water current into shaft power is achieved in my new captive water current power system in two stages. The principle of the operation is obvious from FIGS. 1 and 2, illustrating the side and plan views of a power unit having a buoyant body structure 1, floating on water surface 2, exposed to a current flow 7, retained by a mooring cable 8 and supporting hydrofoil wings 3, 4, 5, and 6 extending into the water. Keel wings 3 with rudder rings 4 are stationary with respect to said body structure, arranged in an airplane type wing and tail configuration and exposed to relative flow 7, forming the first energy conversion stage in my system. There can be one set or a number of sets of keel wings and rudder wings arranged as practiced with monoplanes, biplanes and multiplanes. Also the relative size of subject wings can be varied as in tandem aircraft. For the purpose of explaining the principle of my invention, the description will be limited to the details of only one of each functional subassembly since the operation in combinations is the same. The action of said first stage is to concentrate the naturally low energy density of most water currents, by sweeping out and slowing down a large cross section of such currents, producing aerodynamic lift forces which propel said power unit to higher speed than the current, as indicated by relative flow 7, along its captive path controlled by mooring cable 8.

The second energy conversion stage is a turbine rotor having hydrofoil wings 5 and 6, rotating about turbine mainshaft axis 9—9 exposed to said higher relative flow speed. Said mainshaft is in positive coupling with on board machinery indicated at 10.

My new two-stage arrangement is an importance because of the well known fact that turbine power increases with the third power of the flow speed. My aerodynamically clean first stage stationary wing system can easily propel said power unit sideways in the natural current to several times that speed. Already at a relative flow of twice the current, the size of my second stage turbine for a given power can be 8 times smaller versus a similar turbine exposed to the current directly. At three times speed increase it becomes 27 times smaller. Consequently, my application of the power unit itself as a stationary wing stage keeps the much more complicated and expensive turbine less costly to procure and to operate. Furthermore, natural currents are abundantly available in oceans, but because of their slow speed, require presently such large size turbines to become economically viable, that the technical feasibility is marginal. My new two-stage approach overcomes these limitations.

Said mooring cable 8 is part of mooring means such as naval anchoring gear, or any other connecting gear extending from said power units to ground fixed mooring points, imposing a captive motion pattern on said power units in said water current.

Furthermore, efficient operation depends on good hydrodynamic performance of all hydrofoil wings to provide maximum lift at minimum drag, and also on directionally stable motion and maneuvering capability of each power unit to follow said captive motion pattern. This is accomplished by control means effecting the adjustment of the angles of attack of said keel wings and rudder wings as indicated at 11 and 12, as well as at 13 and 14 for said turbine rotor wings. Such control means are mechanical or hydraulic actuators acting on linkage connected to bell cranks at said wings, whereby the stroke of each actuator is proportioned to the measured output of instant operational data of said power system.

In more detail, FIGS. 1 and 2 show a preferred embodiment for my invention where said body structure 1 provides sufficient buoyancy to float as a water craft, keeping all components above water line 2 with exception of said hydrofoil wings extending downward into said relative flow 7. This is an important feature of my invention, because the high parasitic drag in water is avoided, and by application of a high aspect ratio for said wings a near ideal lift over drag ratio can be achieved, being the major criteria for optimum performance. Pivotal mounting of mooring cable 8 is provided by a turning ring attachment indicated at 15, allowing rotational adjustment between said mooring cable and said power unit about captive axis 16—16. Said keel wing 3 is pivotally mounted about keel wing axis 17—17 by means of a sealed hub 18. The center of gravity for the complete power unit lies below said water line and in the ideal case said pivot and keel wing axes should go through said center of gravity in order to eliminate inertia reaction moments. But because of the relatively slow movements it is sufficient to maintain close proximity between said axes and the vertical axis through said center of gravity as indicated at 22. Rudder wing 4 is pivotally mounted about rudder axis 19—19. Said wings 5 and 6 form a blade assembly of a cycloidal turbine such as described in dtail in my patent application "Cycloidal Fluid Flow Engine" Ser. No. 906,879; AU 343 previously issued, and "Alternating-Lift Wing System" applied for on Sep/3/80. Cycloidal engines are turbines and propellers in general, having in specific their mainshaft transverse to the external flow, and their blade assemblies move on a cylindrical orbit around it, but with respect to the external flow, the blades follow a cycloidal or trochoidal path. It should be understood that any other type of turbines having hydrofoil type blade assemblies exposable to said current is included in my invention besides the illustrated embodyment. Furthermore, simplified embodiment employing at some wings fixed mounting suitable for operation within a narrow range of variations is included as well.

The lift forces are centered at the half span of each wing. In order to avoid tilting by the pull of said mooring cable it should be attached in plane with a plane through said half span range as indicated by line 24—24. Attachment as illustrated at 15 is of operational advantage but requires means to keep said unit level, such as floats 25 on outriggers, or a second counter balancing attachment as indicated at 26 connecting up to the bottom of said unit, or a concentric rail ring attachment in said plane through the half span as indicated at 27, allowing free rotation of said craft inside.

Figure 3:
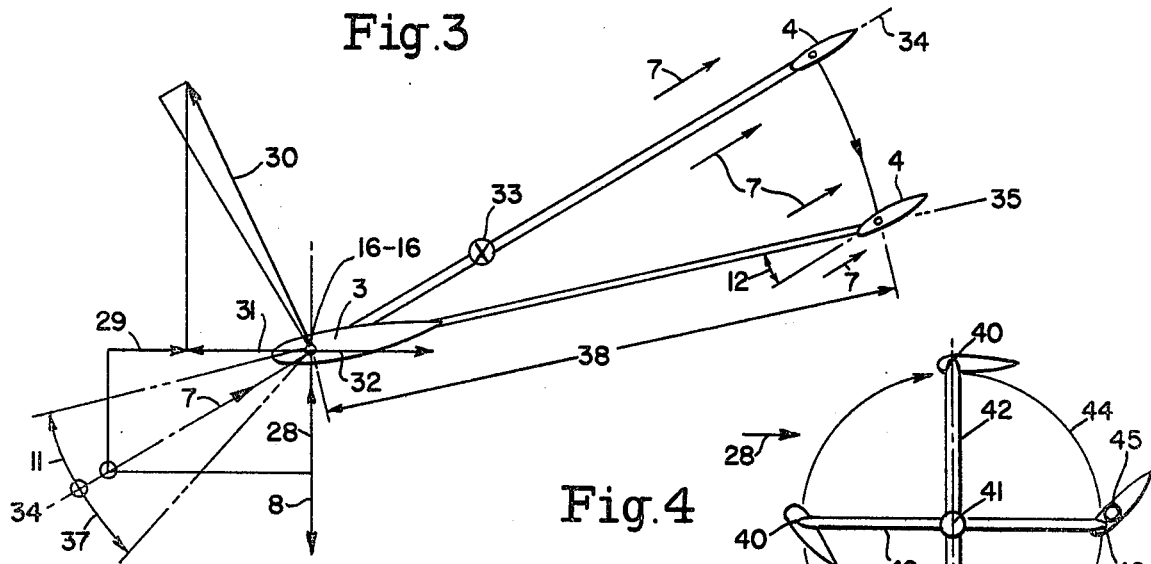
FIG. 3 is a diagram of the speed and force situation at a power unit.

The diagram FIG. 3 illustrates an example for the operation of said first stage producing a relative flow 7 of twice the natural current speed 28. The pulling force of the mooring cable 8 retains keel wing 3 from drifting with the current, causing a foreward motion tangential to said captive path because of the forward tilted position of said wing. This tangential flow 29 together with said current 28 produces said relative flow 7 acting on said wing 3 at an angle of attack 11, producing a resultant lift force 30, whose projection tangential to said path delivers the propelling force 31, moving said power unit along said captive path against the total drag 32, composed mainly of the operational drag of said second stage turbine operating in said relative flow, and of some parasitic drag of the power unit bottom and the rudder wing. The tail moment arm 38 and the rudder wing area are dimensioned by well known airplane analysis in order to achieve proper location of the common center of pressure 33 downstream from said captive axis, assuring said directional and maneuvering stability. The tail positions at 34 and 35 show that control of deflection angles at said keel wing and or at said rudder wing will produce the required angle of attack at said keel wing. In order to negotiate a closed captive path, said power unit must turn around, receiving the current from the other side for half the orbit, requiring to reverse said angles of attack accordingly to the other side as indicated at 37. The same cyclic change of angle of attack is required at all other wings employed at said first stage as well as at said second stage.

Figure 4:
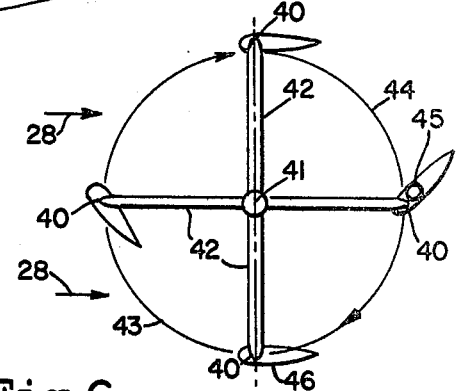
FIG. 4 shows a circular mooring arrangement for a system of power units.

FIG. 4 shows a mooring arrangement for four said power units indicated at 40 around a mooring point 41 to which said units are rotatably connected by radial mooring arms 42. Said arms must support said units against said natural current 28 during the upstream loop indicated at 43, putting compression into said arms, while during the downstream loop 44 said arms are under tension. Said arms keep said units on a circular captive path and do not transmit any of their propulsive energy as torque to said mooring point as if that was the mainshaft, rather said energy is used individual in each power unit by said second stage turbine rotor on board as indicated at 45. There is a critical zone in the path indicated at 46, where no said propelling force is present when passing through the counter current straight ahead. This zone must be passed by the momentum of motion in said unit. Comparing FIG. 4 with the turbine rotor in FIG. 2, it can be seen that basically said power units are acting like the blade assemblies of my reference "Cycloidal Fluid Flow Engine", and that many of the claims are applicable. The new feature is that each of such blade assemblies has a piggyback turbine mounted as a second stage energy converter.

Figure 5:
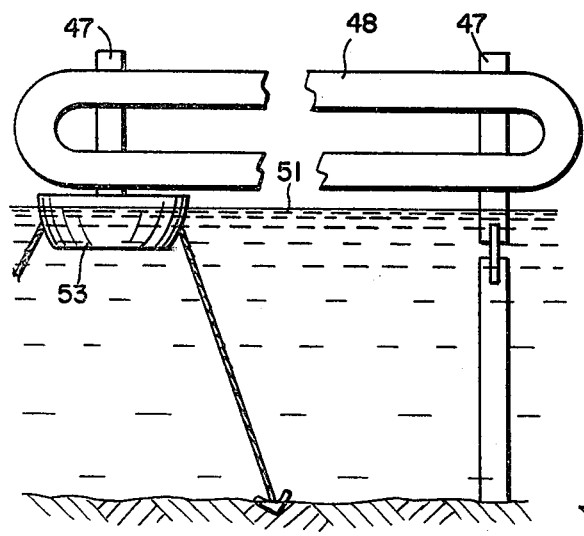
FIGS. 5 and 6 illustrate the front and side views of another mooring system.
Figure 6:
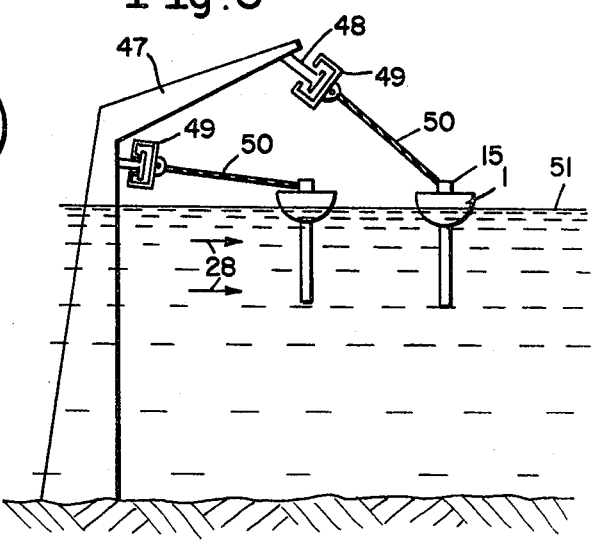

FIGS. 5 and 6 show the front and side views of a mooring arrangement having all moveable components in tension, allowing for use of mooring cables instead of rigid structure. Mooring masts 47, erected from the ground or from moored barges, closed guide rail system 48 having trolleys 49 from which mooring cables 50 extend to said mooring attachment 15 at each power unit employed. The tilted arrangement allows said units to run a continuous path on the water surface, indicated at 51, without interference. Said rail must run quasi perpendicular to said current 28. Change in direction of current can be accommodated by moving one of the barges with said mooring mast illustrated at 53.

Figure 7:
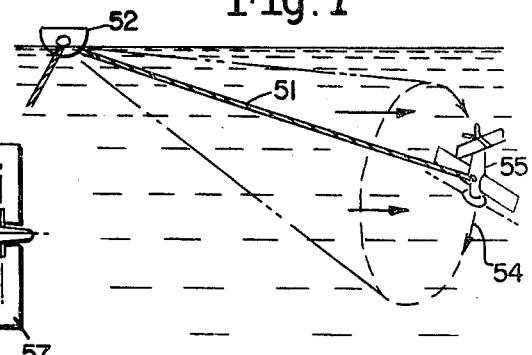
FIG. 7 shows a submerged mooring system.

While the up to now described power unit configurations float on the water, moving on a captive path in a horizontal plane having the current parallel with the plane of motion, an alternate configuration being neutrally buoyant moves in the water on a quasi vertical plane, having the current transverse to the plane of motion, representing the principle of axial flow turbines. In FIG. 7, mooring cable 51 extends from a mooring point 52 to a neutrally buoyant power unit 55, effecting a closed captive path 54 along the base ellipse of a mooring cone described by said mooring cable.

Figures 8, 9:
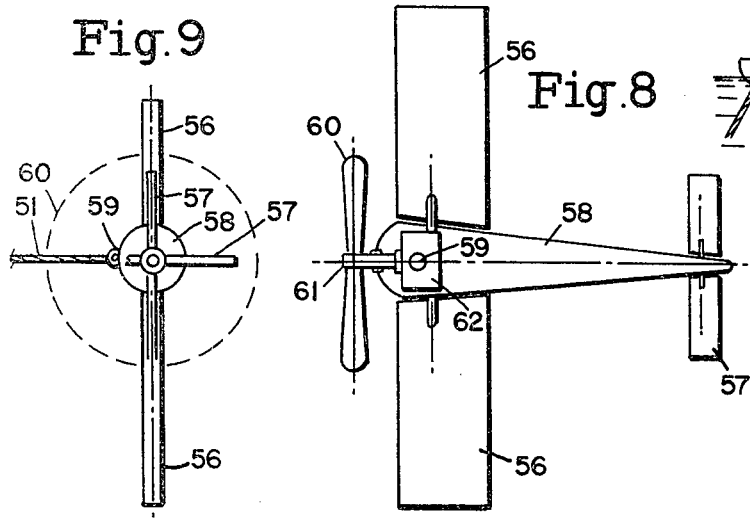
FIGS. 8 and 9 illustrate a plan and side view of an alternate power unit.

FIGS. 8 and 9 illustrate a plan and side view of a neutrally buoyant power unit having a stationary hydrofoil wing system of keel wings 56 extending symmetrically sideways, and rudder wings 57 extending crosswise from said buoyant body structure 58. Mooring cable 51 is fastened at mooring attachment 59, staying quasi perpendicular to the plane of said keel wings and not parallel as in the floating power unit case. Crosswise rudder wings are needed for pitch and yaw control as required for aircraft. Said rotating hydrofoil wing system as a second stage becomes now an axial flow turbine 60, having its wings radially extending from mainshaft 61, driving machinery 62.

It is to be understood, that the various new combinations of structural elements of which my invention consists can be variously arranged and is not limited to the arrangements as described.

I claim:

1. A captive water current energy conversion power system, comprising: at least one power unit, each comprising a buoyant body structure, a plurality of hydrofoil wings extending downwardly into said water current and being pivotally mounted on said body structure to permit readjustment of their angle of attack, said hydrofoil wings capturing said water currents, and producing aerodynamic lift forces to propel said body structure and water current at a higher relative speed, at least one second set of hydrofoil wing system rotatably mounted on said body structure at a position rearwardly of said plurality of wings and being exposed to said higher speed current, power generating machinery mounted on said body structure and being attached to said second set of wing system where by the energy held by the current is converted to revolving motion of said power generating machinery, mooring means attached to said body structure and an anchor structure to effect said captive path of said body structure through said water current, and control means for effecting the angle of attack adjustment of said plurality of hydrofoil wings.

2. A captive water current power system as set forth in claim 1, wherein said body structure forms a floating craft, being pivotally connected to said mooring means about a captive axis parallel and in proximity to a front keel wing pivot axis and the vertical axis through the center of gravity of said body structure.

3. A captive water current power system as set forth in claim 2, wherein said floating craft is stabilized by leveling means.

4. A captive water current power system as set forth in claim 3, wherein said hydrofoil wings are cyclicly deflected to effect a reversal of angle of attack with each reversal of the traversing direction in the natural current.

5. A captive water current power system as set forth in claim 4, wherein each floating craft carries at least one piggyback cycloidal fluid flow engine or turbine being a second stage energy conversion means.

6. A captive water current power system as set forth in claim 5, wherein said mooring means consists of a tilted, closed guide rail system supported above the water, said rails carrying trolleys from which mooring cables extend to each said body structure.

7. A captive water current power system as set forth in claim 6, wherein said mooring means consist of a mooring cable extending from a mooring point to said body structure moving on an elliptic path within the mooring cone.

8. A captive water current power system as set forth in claim 7, wherein said body structure is neutrally buoyant, moving along a captive submerged path, having said hydrofoil wings extending symmetrically from said body structure, and carrying at least one axial flow turbine as a second stage energy conversion means.

* * * * *